(12) United States Patent
Wood et al.

(10) Patent No.: US 12,742,488 B2
(45) Date of Patent: Sep. 22, 2026

(54) MOWER DRIVE BELT TENSIONER AND DRIVE TRAIN OF MOWER

(71) Applicant: KUBOTA CORPORATION, Osaka (JP)

(72) Inventors: Isaac Wood, Gainesville, GA (US); Brandon Pantas, Gainesville, GA (US); Amber Coen, Gainesville, GA (US); Justin Mccallister, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 4 days.

(21) Appl. No.: 18/991,740

(22) Filed: Dec. 23, 2024

(65) Prior Publication Data

US 2026/0177133 A1 Jun. 25, 2026

(51) Int. Cl.

*F16H 7/12* (2006.01)
*A01D 34/66* (2006.01)
*A01D 34/82* (2006.01)
*A01D 101/00* (2006.01)
*F16H 7/08* (2006.01)

(52) U.S. Cl.

CPC ........... *F16H 7/1263* (2013.01); *A01D 34/66* (2013.01); *A01D 34/82* (2013.01); *A01D 2101/00* (2013.01); *F16H 2007/0806* (2013.01); *F16H 2007/0842* (2013.01)

(58) Field of Classification Search

CPC ...... F16H 7/12; F16H 7/08; F16H 2007/0806; F16H 2007/0842; F16H 7/1263; A01D 34/66; A01D 34/82; A01D 2101/00

USPC .......................................................... 474/136

See application file for complete search history.

(56) References Cited

U.S. PATENT DOCUMENTS 3,641,830 A * 2/1972 Stofer .................. F16H 7/1254 474/122
5,030,173 A * 7/1991 Bryant .................. B65G 23/44 474/138
5,045,030 A * 9/1991 Cunningham ........ F16H 7/1263 474/138
6,931,825 B2 * 8/2005 Stineman ............... A01D 34/82 56/6
11,009,105 B2 * 5/2021 Veer .......................... F16H 7/06
2015/0057117 A1 * 2/2015 Antchak .................. F16H 7/12 474/109

(Continued)

*Primary Examiner* — Minh Truong
*Assistant Examiner* — Mark K Buse
(74) *Attorney, Agent, or Firm* — MORI & WARD, LLP

(57) ABSTRACT

A mower drive belt tensioner includes a shaft and an idler arm including a pulley support configured to rotatably support an idler pulley and a shaft support connected to the shaft. The shaft support protrudes from the shaft in a radial direction with respect to a central axis of the shaft. A flange is provided on the shaft and protrudes from the shaft in the radial direction. A guide tube is configured to slidably receive the shaft. A stay is provided to support the guide tube and includes a spring bearing protruding from the guide tube in the radial direction. A spring is selectively provided in a first space provided around the shaft and the guide tube between the spring bearing and the flange and a second space provided around the shaft and the guide tube between the spring bearing and the shaft support to bias the idler pulley.

20 Claims, 12 Drawing Sheets

(56) References Cited

U.S. PATENT DOCUMENTS

| | | | | |
|---|---|---|---|---|
| 2016/0007526 | A1* | 1/2016 | Greulich | F16H 7/1281<br>56/14.7 |
| 2020/0080622 | A1 | 3/2020 | Foster | |
| 2021/0131530 | A1 | 5/2021 | Quintanilla Salas et al. | |
| 2022/0235597 | A1* | 7/2022 | Hawkins | F16H 7/12 |
| 2025/0180099 | A1* | 6/2025 | Southwell | A01D 34/76 |

* cited by examiner 5
4
2
15
19
16
17
18
14
21
12
11
10

Ax
32
34
36
38
(38N)
S1
35
60
52
40
43
44
50
35
30
S2
31
28
24
22
20
21
19

Ax
32
37
34
30
S1
36
50
35
52
40
43
44
S2
62
35
28
(28b)
24
29
28h
20
22
23
19

20
23
MP
Ax
22
24
S2
50
19
52
54
43
30
64
S1
36
38
(38N)
34
Ax
32

40
43
41
48
42
44
45
46
47

32
34
35
64
40
43
44
30
Ax
31

22
23
29
29ob
29ib
24
25
28h
20

MOWER DRIVE BELT TENSIONER AND DRIVE TRAIN OF MOWER

BACKGROUND

Technical Field

The present invention relates to a mower drive belt tensioner and a drive train of a mower.

Discussion Of The Background

US 2021/0131530A1 and US 2020/0080622A1 each describe a mower having a drive train configured to rotate cutting blades. The drive train includes a drive pulley, driven pulleys, a drive belt, and an idler pulley. The drive pulley is configured to be rotated by a prime mover such as an engine to rotate the drive belt. The drive belt is configured to transfer power from the drive pulley to the driven pulleys. The driven pulleys are configured to rotate to power the cutting blades. The idler pulley is configured to contact the drive belt to provide tension. The drive train further includes a drive belt tensioner including a spring to pull or push the idler pulley to maintain proper belt tension and alignment of the drive belt.

SUMMARY

In accordance with one aspect of the present disclosure, a mower drive belt tensioner includes an idler pulley, an idler arm, a shaft, a flange, a stay, and a spring. The idler pulley is configured to be engaged by a drive belt. The idler arm includes a pulley support configured to rotatably support the idler pulley, and a shaft support opposite to the pulley support. The shaft has a central axis along which the shaft extends. The shaft is connected to the shaft support of the idler arm. The shaft support protrudes from the shaft in a radial direction with respect to the central axis. The flange is provided on the shaft apart from the shaft support and protrudes from the shaft in the radial direction. The guide tube is provided between the shaft support and the flange along the central axis and configured to slidably receive the shaft. The stay is provided on a mower deck to support the guide tube and includes a spring bearing protruding from the guide tube in the radial direction. The spring is selectively provided in a first space and a second space to bias the idler pulley. The first space is provided around the shaft and the guide tube between the spring bearing and the flange. The second space is provided around the shaft and the guide tube between the spring bearing and the shaft support.

In accordance with another aspect of the present disclosure, a mower drive belt tensioner includes an idler pulley, an idler arm, a shaft, a flange, a stay, and a spring. The idler pulley is configured to be engaged by a drive belt. The idler arm includes a pulley support configured to rotatably support the idler pulley, and a shaft support opposite to the pulley support. The shaft has a central axis along which the shaft extends. The shaft is connected to the shaft support of the idler arm. The shaft support protrudes from the shaft in a radial direction with respect to the central axis. The flange is provided on the shaft apart from the shaft support and protrudes from the shaft in the radial direction. The guide tube is provided between the shaft support and the flange along the central axis and configured to slidably receive the shaft. The guide tube includes a first tube end facing the flange, a second tube end facing the shaft support, and a through hole which extends from the first tube end to the second tube end and through which the shaft passes. The stay is provided on a mower deck to support the guide tube. The spring is selectively provided in a first space and a second space to bias the idler pulley. The first space is provided around the shaft between the first tube end and the flange. The second space is provided around the shaft between the second tube end and the shaft support.

In accordance with further aspect of the present disclosure, a drive train of a mower includes the mower drive belt tensioner according to the one aspect, the mower deck supporting the stay, a drive pulley, a driven pully, and the drive belt. The drive pulley is rotatably provided on the mower deck and configured to be driven by a prime mover. The driven pulley is rotatably provided on the mower deck and configured to rotate a cutting blade. The drive belt loops around the idler pulley, the drive pulley, and the driven pulley. The spring is configured to tighten the drive belt into engagement with the idler pulley, the drive pulley, and the driven pulley.

In accordance with further aspect of the present disclosure, a drive train of a mower includes the mower drive belt tensioner according to the other aspect, the mower deck supporting the stay, a drive pulley, a driven pully, and the drive belt. The drive pulley is rotatably provided on the mower deck and configured to be driven by a prime mover. The driven pulley is rotatably provided on the mower deck and configured to rotate a cutting blade. The drive belt loops around the idler pulley, the drive pulley, and the driven pulley. The spring is configured to tighten the drive belt into engagement with the idler pulley, the drive pulley, and the driven pulley.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

<Mower>

Figure 1:
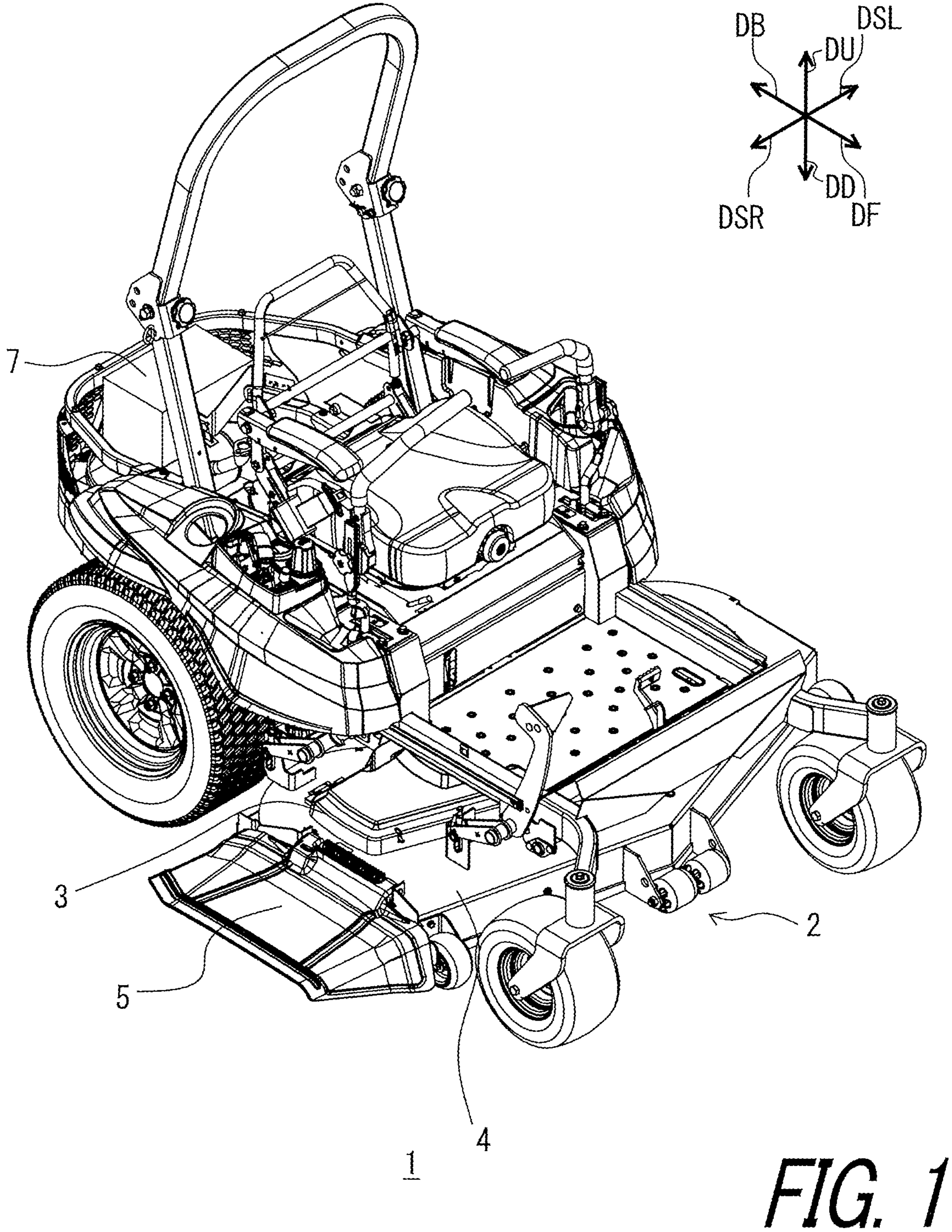
FIG. 1 shows a perspective view of the mower.

FIG. 1 is a perspective view of a mower 1 according to an embodiment of the present disclosure. The mower 1 is configured to cut grass and other vegetation. The mower includes a mower deck 2 which serves as a housing for cutting blades and a drive train 10 (explained later) configured to rotate the cutting blades. The mower 1 may incorporate adjustable height mechanisms to change a height of the mower deck 2. The mower deck 2 includes a top cover 3, a deck frame 4, and a discharge shroud 5.

Figure 2:
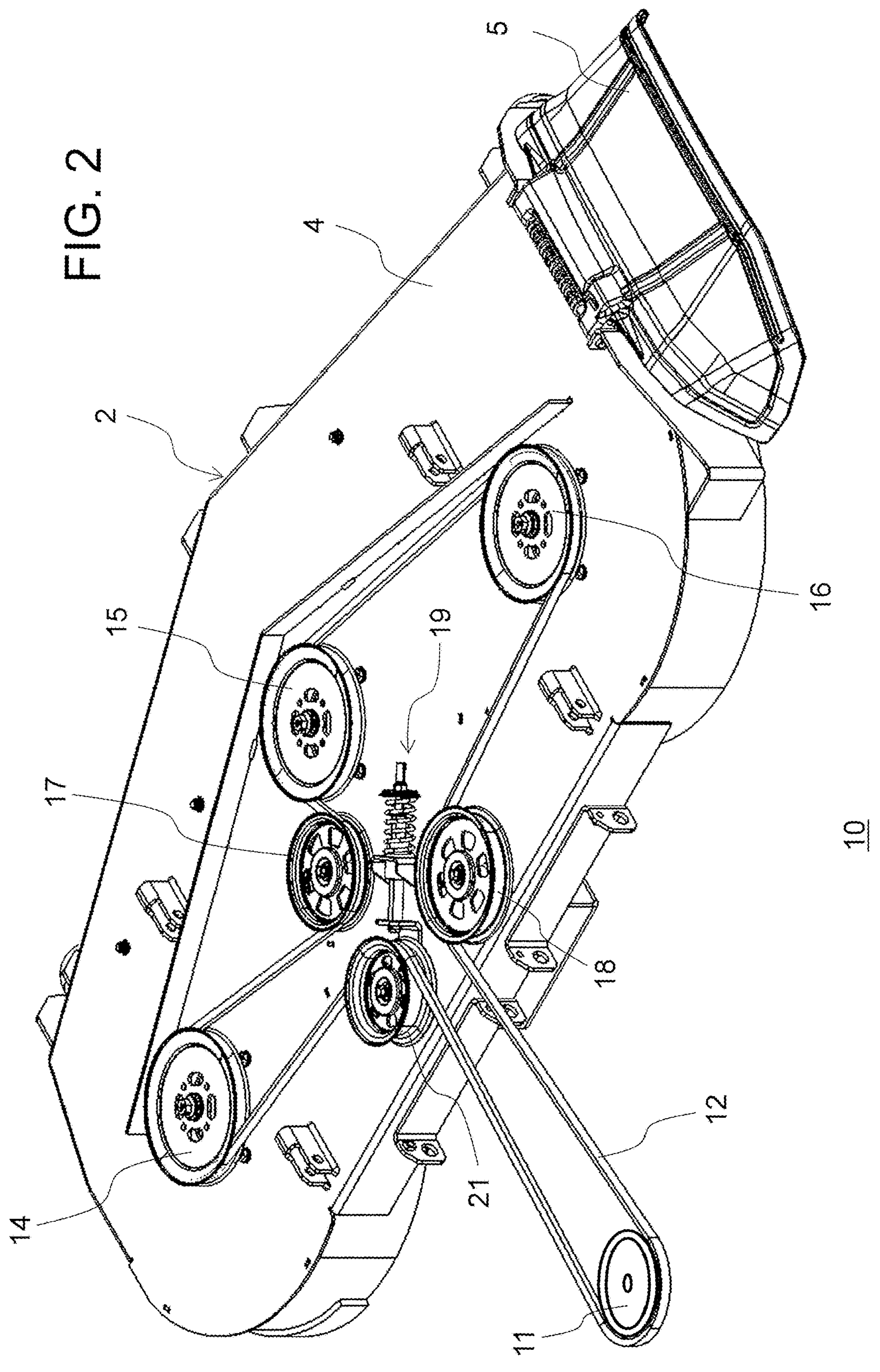
FIG. 2 shows a perspective view of a drive train of the mower.

The top cover 3 is positioned above the deck frame 4 and covers a part of drive train 10 which is shown in FIG. 2. The top cover 3 may be removable to allow easy access for maintenance and repairs of the drive train 10. The deck frame 4 covers the cutting blades (not shown). The deck frame 4 is designed with a shape that optimizes grass cutting and discharge, often featuring a curved or angled profile to direct cut grass towards the discharge shroud 5. The deck frame 4 is typically constructed from sturdy materials such as steel tubing or reinforced aluminum to ensure durability and stability during operation. In alternative embodiments, the deck frame 4 may be constructed from lightweight composite materials to reduce overall weight while maintaining strength. The discharge shroud 5 is positioned on one side of the deck frame 4 and directs the flow of cut grass away from the mower 1. The discharge shroud 5 is designed to efficiently channel grass clippings, preventing clogging and ensuring a clean discharge.

The mower 1 further includes a prime mover 7 configured to provide power necessary to operate the mower 1. Typically, this is an internal combustion engine, but alternative embodiments may utilize electric motors or hydraulic power systems. The prime mover 7 is mounted securely to a vehicle frame of the mower 1 and is connected to the cutting blades via the drive train 10. The power output of the prime mover 7 can vary depending on the size and intended use of the mower 1, ranging from small engines for residential use to larger, more powerful engines for commercial applications.

The mower 1 is designed to move in various directions as indicated by the directional arrows. The forward direction DF and backward direction DB allow the operator to maneuver the mower 1 across the area to be cut. The upward direction DU and downward direction DD may relate to the adjustment of cutting height or the lifting of the mower deck 2 for transport or maintenance. The leftward direction DSL and rightward direction DSR enable the operator to steer the mower 1 and navigate around obstacles. The mower 1 has hydraulic motors to rotate respective rear wheels, and the mower 1 is steered by rotating the rear wheels differently.

In operation, the prime mover 7 powers the cutting blades housed within the mower deck 2. As the mower 1 moves forward in direction DF, the rotating blades cut the grass, and the curved design of the interior of the deck frame 4 directs the grass clippings towards the discharge shroud 5. The discharge shroud 5 expels the grass clippings in a controlled manner, typically to the side of the mower 1. The operator can adjust the mower's direction using the steering mechanisms like a control lever. However, the mower 1 may have a steering wheel, or other control interfaces as the steering mechanism.

<Drive Train>

FIG. 2 illustrates a perspective view of a drive train 10 provided on the deck frame 4 of the mower deck 2. The drive train 10 includes a drive pulley 11, a drive belt 12, multiple driven pulleys 14, 15, 16, tensioning pulleys 17, 18, and a mower drive belt tensioner 19. This selective spring placement allows for versatile tensioning configurations, enabling the tensioner to either pull or push the idler arm as needed for optimal belt tension. The deck frame 4 provides mounting points for components of the drive train 10.

The drive pulley 11 is the primary power input for the drive train 10. It is typically connected to the prime mover 7 and is configured to rotate to drive the drive belt 12. Features such as a clutch mechanism to engage or disengage the drive pulley 11 with the prime mover 7 may be incorporated between the drive pulley 11 and the prime mover 7.

The drive belt 12 is a continuous loop that transfers power from the drive pulley 11 to the driven pulleys 14, 15, 16. More specifically, the drive belt 12 loops around the idler pulley 21, the drive pulley 11, and the driven pulleys 14, 15, 16, The drive belt 12 is typically made of reinforced rubber or synthetic materials designed for high flexibility and durability. The drive belt 12 may have a V-shaped or multi-ribbed profile to increase grip on the pulleys. Some advanced designs may incorporate embedded fibers or sensors to monitor belt wear and tension.

The driven pulleys 14, 15, 16 are connected to the cutting blade spindles and rotate to power the cutting blades. These spindles may incorporate bearings and seals to ensure smooth operation and prevent contamination. In this embodiment, the number of driven pulleys 14, 15, 16. However, the drive train 10 may have a different number of driven pulleys. In some embodiments, the driven pulleys 14, 15, 16 may have different diameters to achieve varying blade speeds across the mower deck. The tensioning pulleys 17, 18 are engages with the drive belt 12 to ensure efficient power transfer and prevent belt slippage.

The mower drive belt tensioner 19 is configured to maintain proper belt tension and alignment of the drive belt 12. It includes an idler pulley 21 mounted on an idler arm 20 (explained later). The idler pulley 21 is configured to be engaged by the drive belt 12 to provide tension. It is typically made of durable materials such as steel or high-strength plastics and incorporates sealed bearings for smooth operation. The idler pulley 21 may have a flat or grooved surface depending on the belt design and tension requirements.

In operation, power is transferred from the prime mover 7 to the drive pulley 11, which rotates the drive belt 12. The drive belt 12 then transfers this rotational power to the driven pulleys 14, 15, 16, which in turn power the cutting blades. The tensioning pulleys 17, 18 and the mower drive belt tensioner 19 work together to maintain proper belt tension throughout the system, ensuring efficient power transfer and prolonging belt life.

<Overall Structure of the Mower Drive Belt Tensioner>

Figure 3:
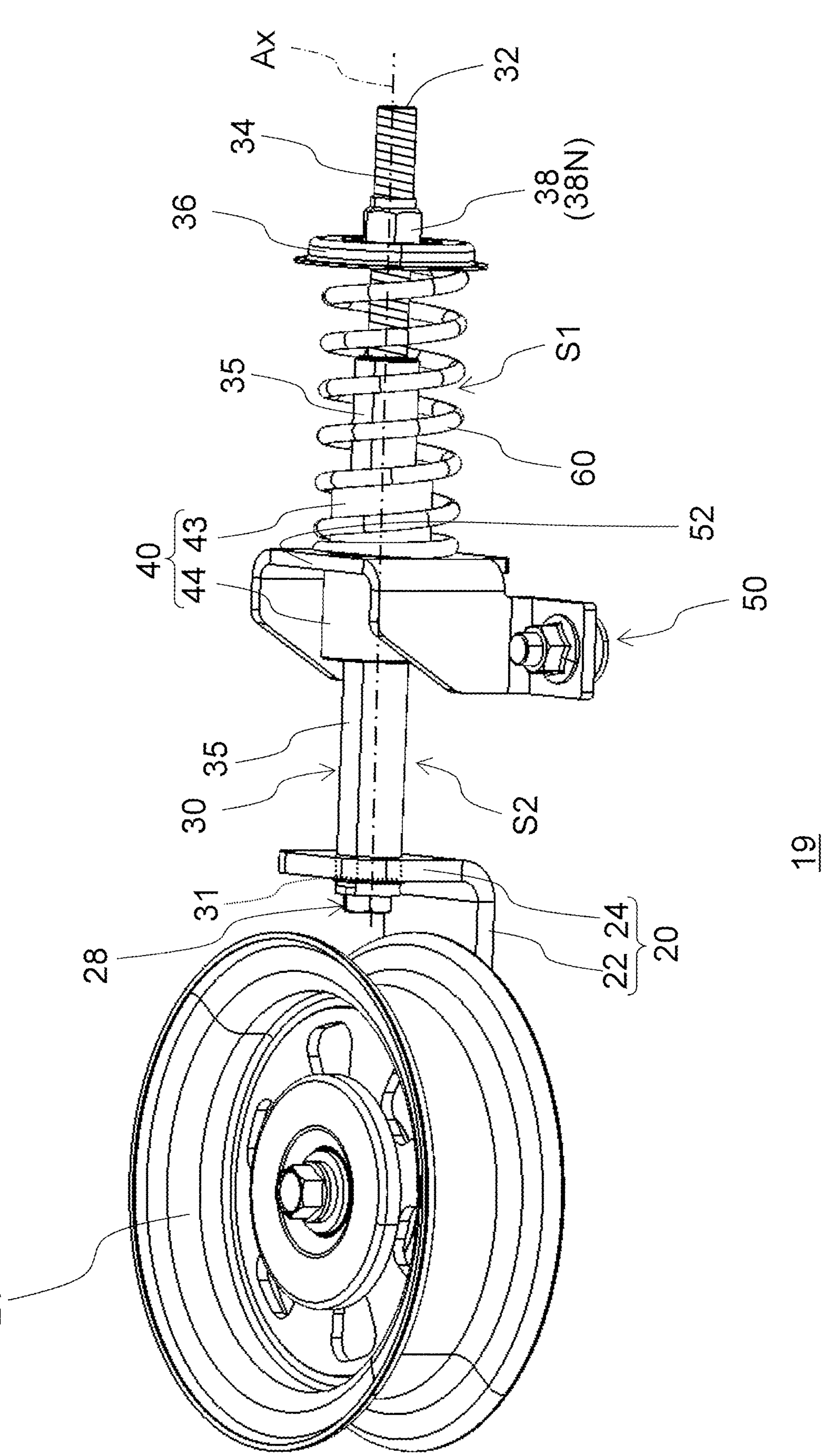
FIG. 3 shows an enlarged perspective view of the mower drive belt tensioner.
Figure 4:
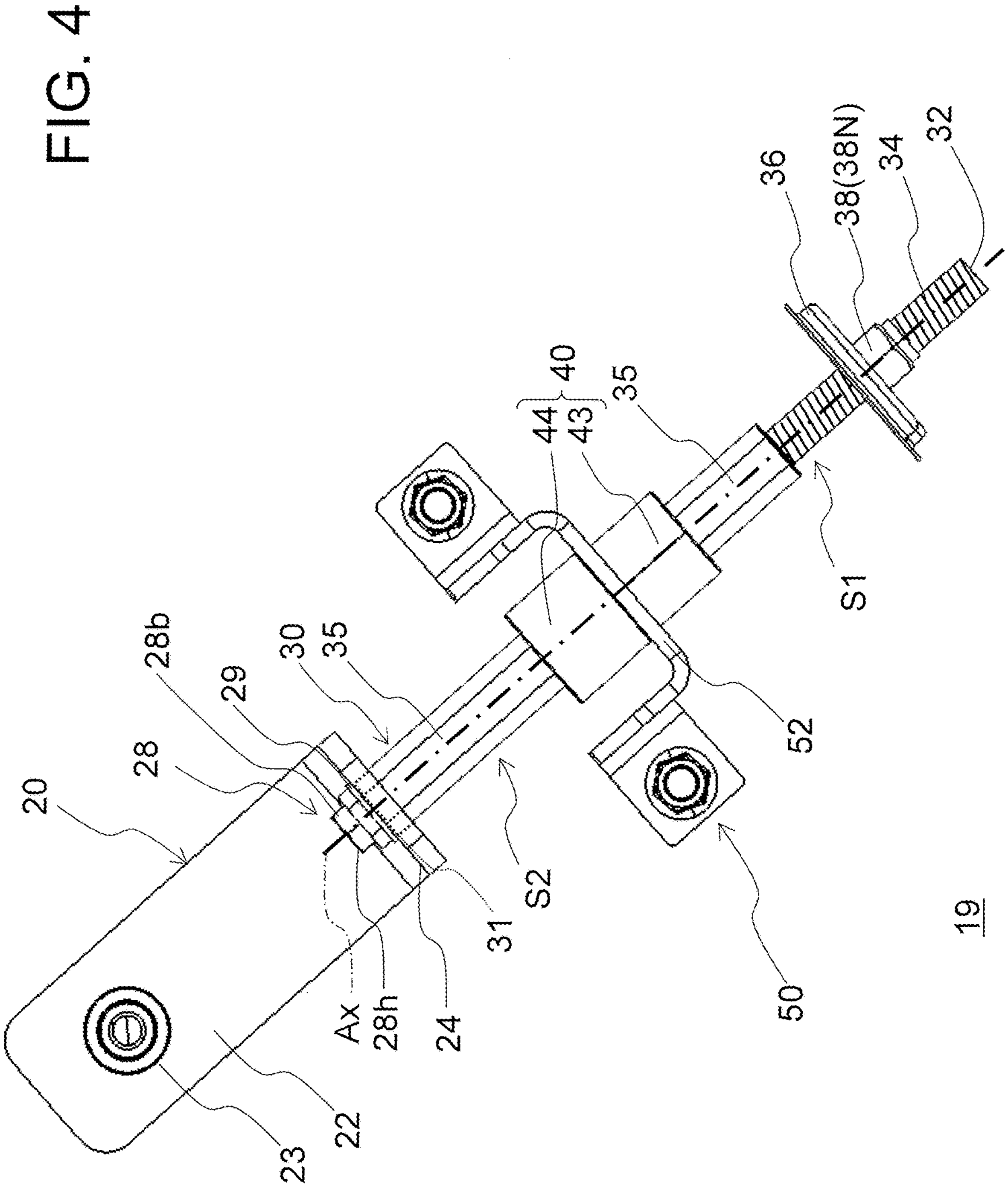
FIG. 4 shows a top view of the mower drive belt tensioner without the idler pulley and spring.
Figure 5:
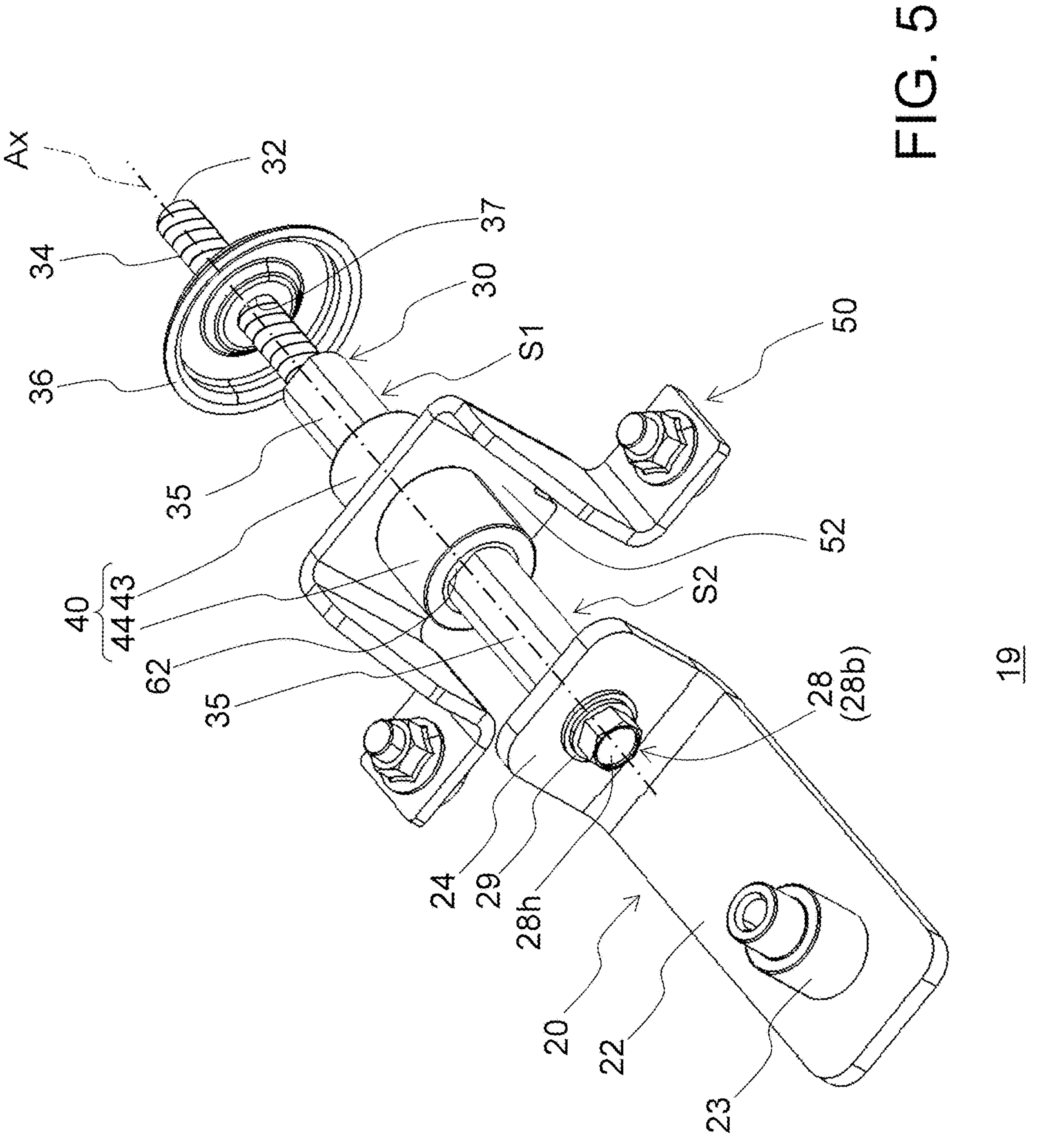
FIG. 5 shows a perspective view of the mower drive belt tensioner without the idler pulley and spring.
Figure 6:
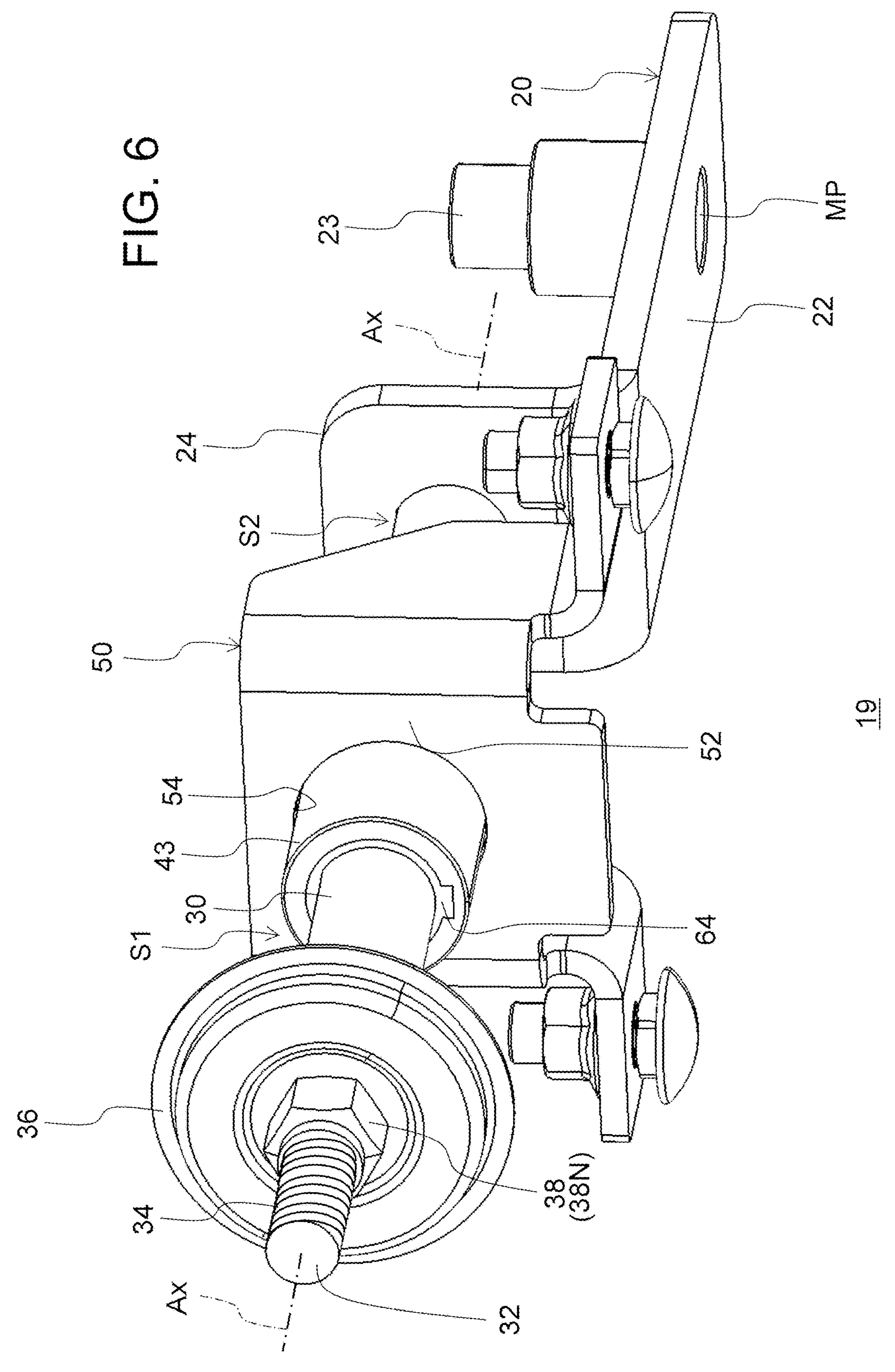
FIG. 6 shows another perspective view of the mower drive belt tensioner without the idler pulley and spring.

FIG. 3 is an enlarged perspective view of the mower drive belt tensioner 19. The mower drive belt tensioner 19 includes the idler arm 20, a second fastener 28, a shaft 30, a flange 36, a first fastener 38, a guide tube 40, a stay 50, and a spring 60. FIG. 4 is a top view of the mower drive belt tensioner 19 without the idler pulley 21 and spring 60. FIG. 5 is a perspective view of the mower drive belt tensioner 19 without the idler pulley 21 and spring 60. FIG. 6 is another perspective view of the mower drive belt tensioner 19 without the idler pulley 21 and spring 60.

As shown in FIGS. 3 to 6, The idler arm 20 includes a pulley support 22 configured to rotatably support the idler pulley 21 and a shaft support 24 opposite to the pulley support 22. The shaft 30 extends along a central axis Ax and is connected to the shaft support 24. The second fastener 28 is provided at the shaft 30 to hold the shaft support 24 on the shaft 30. The second fastener 28 includes a bolt 28*b* with a head 28*h*, and an arm retainer 29 provided between the head 28*h* of the bolt 28*b* and the shaft support 24. The flange 36 is provided on the shaft 30 apart from the shaft support 24. The first fastener 38 is provided on the shaft 30 to fasten the flange 36 onto the shaft 30. The guide tube 40 is provided between the shaft support 24 and the flange 36 along the central axis Ax and configured to slidably receive the shaft 30. The stay 50 is provided on the deck frame 4 of the mower deck 2 to support the guide tube 40. The stay 50 includes a spring bearing 52 protruding from the guide tube 40 in a radial direction with respect to the central axis Ax. The spring 60 is selectively provided in a first space S1 or a second space S2 to bias the idler pulley 21. The spring 60 is configured to tighten the drive belt 12 to engage with the idler pulley 21, the drive pulley 11, and the driven pulleys 14, 15, 16.

<Slidable and Anti-Rotation Structure of the Shaft>

Figure 7:
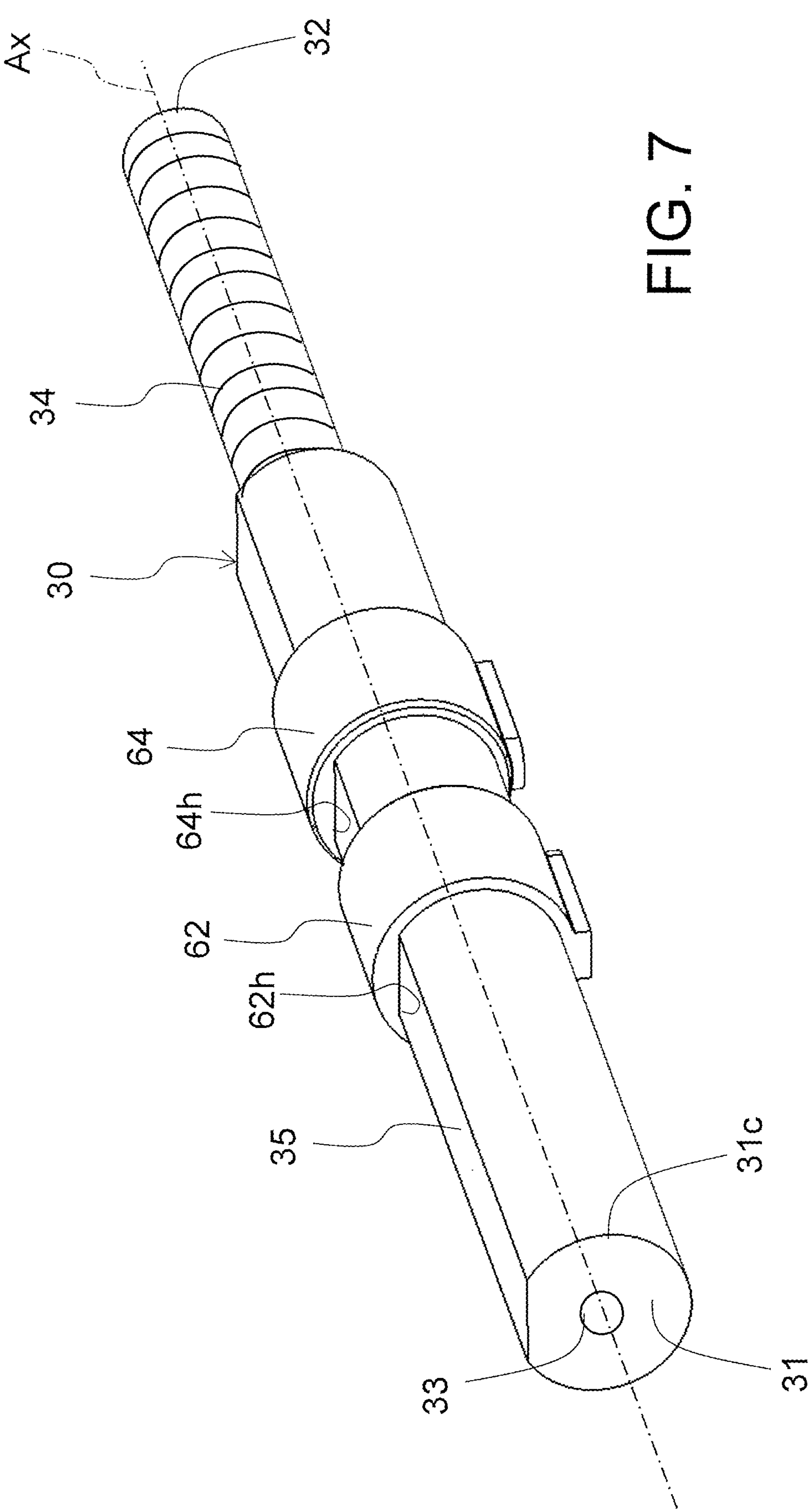
FIG. 7 shows an enlarged perspective view of the shaft with keys.

FIG. 7 is an enlarged perspective view of the shaft 30 with a key 62 and an additional key 64 for the mower drive belt tensioner 19. The shaft 30 is designed to be slidably received within the guide tube 40 of the mower drive belt tensioner 19 via the key 62 and the additional key 64, allowing for adjustable positioning of the idler pulley 21 connected to the shaft 30. The key 62 and the additional key 64 are provided between the guide tube 40 and the shaft 30 to prevent rotation of the shaft 30 with respect to the guide tube 40, ensuring that the shaft 30 maintains its angular orientation relative to the guide tube 40 during operation. This maintains proper alignment of the idler pulley 21 and consistent belt tension. The shaft 30 is a cylindrical component that forms a central part of the mower drive belt tensioner 19. The key 62 and the additional key 64 are typically made of durable metal such as steel or stainless steel to withstand the forces and stresses encountered during operation. In some embodiments, the shaft 30 could be coated with a corrosion-resistant material or treated for enhanced wear resistance. However, the material of the shaft 30 could also be varied, using lightweight alloys or composite materials in applications where weight reduction is a priority, while still maintaining the necessary strength and durability for effective belt tensioning. The length of the shaft 30 can be varied to accommodate different mower designs and belt tensioning requirements.

As shown in FIGS. 3, 4, and 7, the shaft 30 has a first shaft end 31 at which the shaft support 24 is provided and a second shaft end 32 opposite to the first shaft end 31 along the central axis Ax. As shown in FIG. 7, at the first shaft end 31 of the shaft 30, a threaded hole 33 is provided. This threaded hole 33 is designed to receive the bolt 28*b* that secures the shaft support 24 of the idler arm 20 to the shaft 30. That is, the bolt 28*b* is tightened in the threaded hole 33. The threaded hole 33 allows for easy assembly and disassembly of the idler arm 20. In alternative embodiments, the first shaft end 31 may feature a different fastening mechanism such as a snap-fit connection or a keyed slot for attaching the idler arm 20.

As shown in FIGS. 3 to 5 and 7, the shaft 30 includes a male thread 34 provided at the second shaft end 32 and a cutout 35 to which the key 62 and the additional key 64 are inserted. In this embodiment, the mower drive belt tensioner 19 includes both the key 62 and the additional key 64. However, the mower drive belt tensioner 19 may include one of the key 62 and the additional key 64 which might be longer than the key 62 and the additional key 64. Alternatively, the mower drive belt tensioner 19 may include more than three keys having the same feature as those of the key 62 and the additional key 64. The additional key 64 can provide redundancy in the anti-rotation mechanism especially for high-torque applications or allowing for different mounting orientations of the shaft 30 within the guide tube 40. The additional key 64 may be identical to the key 62 or may have different dimensions to accommodate specific design requirements. The central axis Ax of the shaft 30 serves as a reference line for the alignment and movement of the shaft 30 within the mower drive belt tensioner 19. All components and features of the shaft 30 are designed and positioned with respect to this central axis Ax to ensure proper functionality and smooth operation of the tensioner mechanism.

The cutout 35 is machined into the shaft surface. The cutout 35 is located near the second shaft end 32. As shown in FIG. 7, the shaft 30 has a circumference 31*c* around the central axis Ax, the circumference 31*c* extending from the first shaft end 31 to the male thread 34. The circumference 31*c* includes the cutout 35. Furthermore, the key 62 has a shaft insertion hole 62*h* fitting the circumference 31*c* of the shaft 30. The additional key 64 has a shaft insertion hole 64*h* fitting the circumference 31*c* of the shaft 30. Such features prevent rotation of the shaft 30 relative to the t 62, 64. An inner surface of the key 62 that defines the shaft insertion hole 62*h* is smooth and precisely machined to minimize friction and ensure consistent movement of the shaft 30. An inner surface of the additional key 64 that defines the shaft insertion hole 64*h* is smooth and precisely machined to minimize friction and ensure consistent movement of the shaft 30. In some embodiments, the inner surfaces of the key 62 and the additional key 64 and/or the circumference 31*c* of the shaft 30 may be coated with a low-friction material or treated to enhance its wear resistance. The depth and width of the cutout 35 are precisely dimensioned to securely accommodate the keys 62, 64 while allowing for various positions of the keys 62, 64 on the shaft 30.

Figure 8:
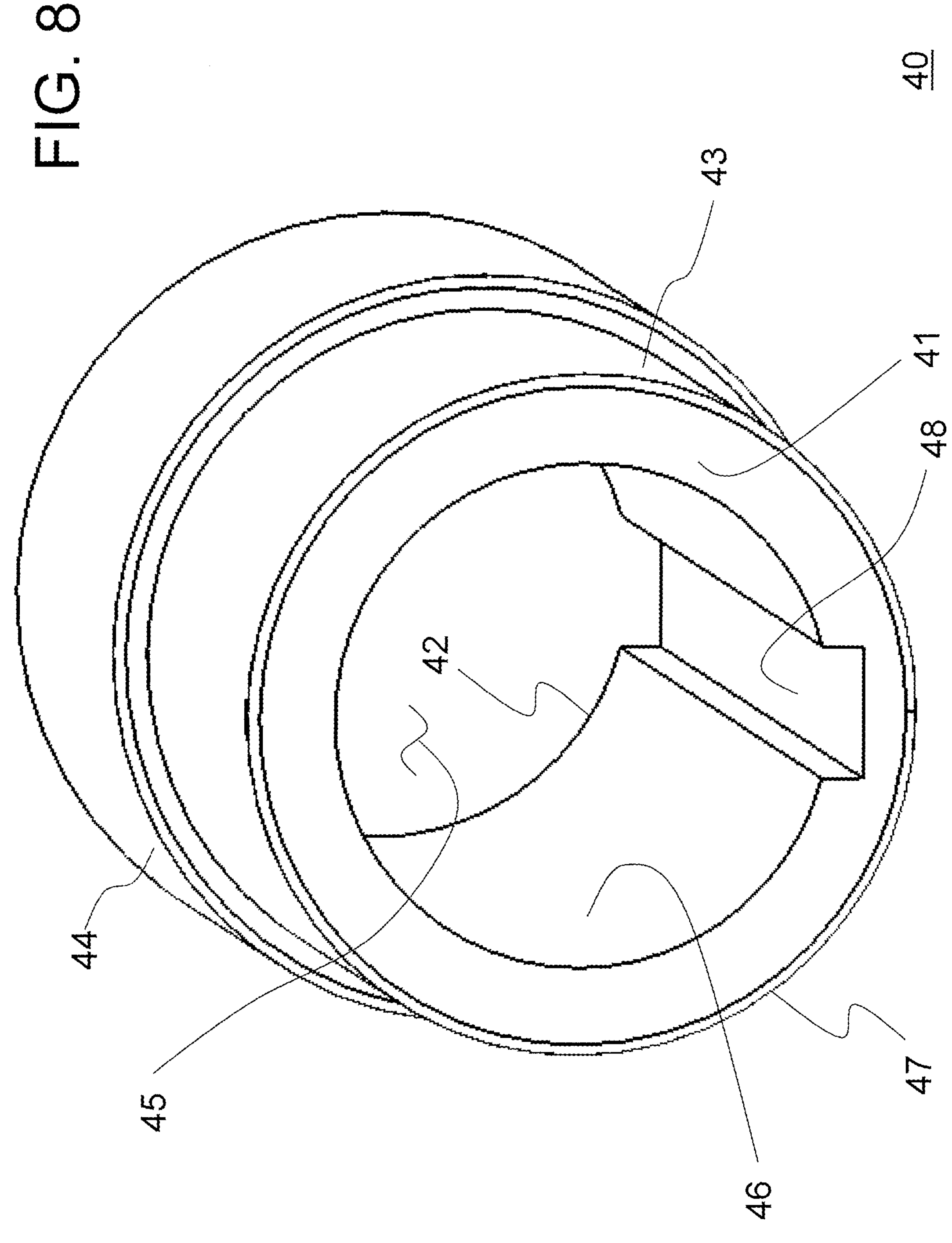
FIG. 8 shows an enlarged perspective view of the guide tube.
Figure 9:
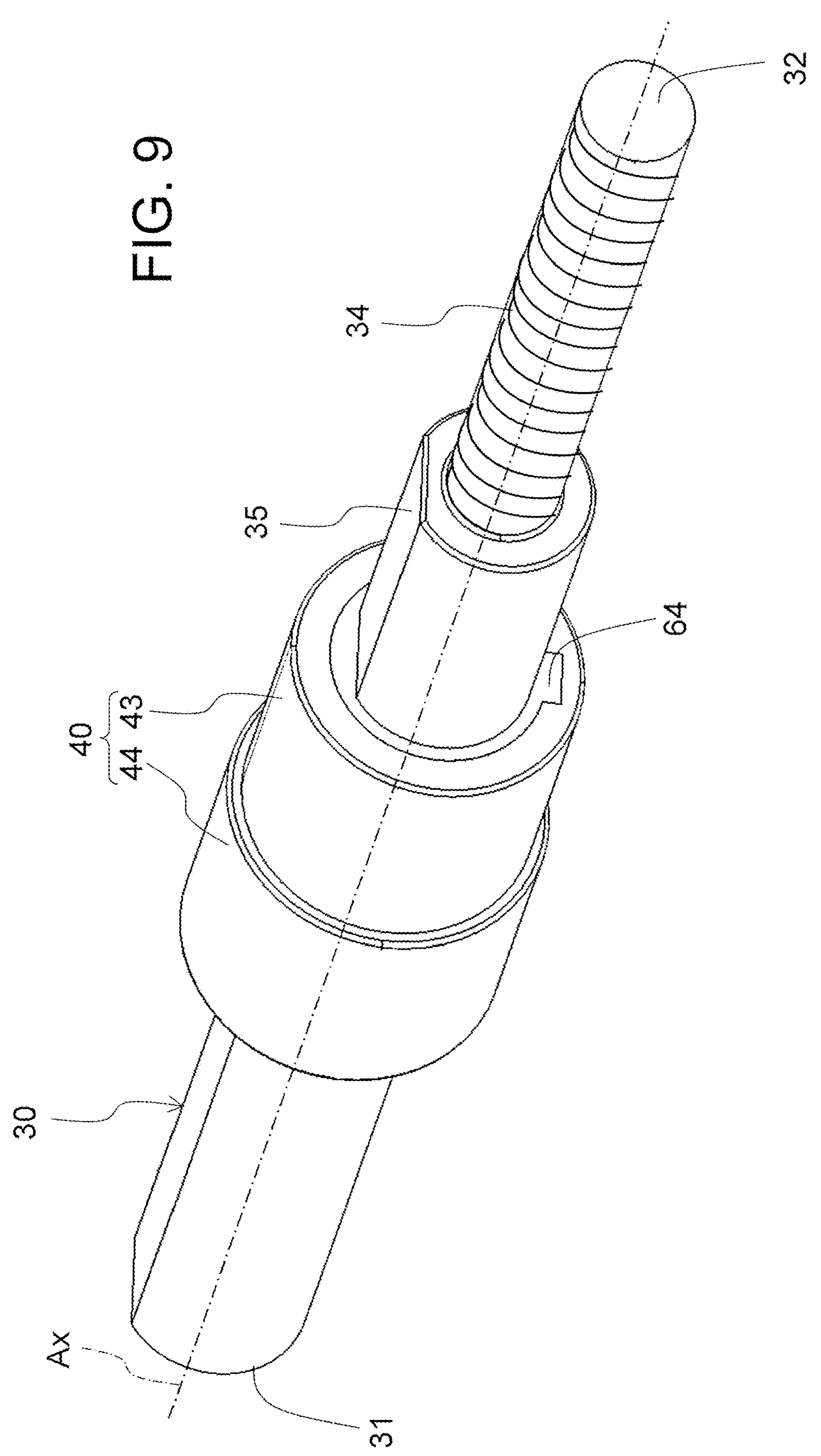
FIG. 9 shows an enlarged perspective view of the shaft with keys and the guide tube.

FIG. 8 is an enlarged perspective view of the guide tube 40 of the mower drive belt tensioner 19. FIG. 9 is another enlarged perspective view of the shaft 30 with the keys 62, 64 and the guide tube 40 of the mower drive belt tensioner 19. As described above, the guide tube 40 and the keys 62, 64 facilitate the sliding movement of the shaft 30. FIGS. 8 and 9 illustrate the various structural features of the guide tube 40 that enable its functionality within the mower drive belt tensioner 19.

As shown in FIG. 8, the guide tube 40 includes a first tube end 41 and a second tube end 42. As shown in FIGS. 4, 8, and 9, the first tube end 41 faces the flange 36 on the shaft 30, while the second tube end 42 faces the shaft support 24 of the idler arm 20. This orientation allows the guide tube 40 to be properly positioned between these two components, ensuring smooth operation of the tensioner mechanism. The guide tube 40 includes a main part 43 that defines its primary structure and a boss 44 protruding from the main part 43 in the radial direction with respect to the central axis Ax. As shown in FIGS. 5 and 6, the boss 44 abuts onto the spring bearing 52 when the main part 43 passes through a tube insertion hole 54 in the spring bearing 52. The boss 44 serves as a contact point for the spring bearing 52 of the stay 50, which is mounted on the mower deck 2. The interaction between the boss 44 and the spring bearing 52 helps to secure the guide tube 40 in its proper position. The boss 44 is adhered to the spring bearing 52 by adhesive or welding after the main part 43 passes through the tube insertion hole 54 in the spring bearing 52 and the orientation of the guide tube 40 is adjusted. Alternative embodiments may include bolt and nut to fix the boss 44 onto the spring bearing 52, multiple bosses, or a continuous ring-like protrusion for enhanced stability.

As shown in FIG. 8, the guide tube 40 includes a tube hole 45 through which the shaft 30 passes. The tube hole 45 extends through its entire length, from the first tube end 41 to the second tube end 42. Furthermore, the guide tube 40 also includes a key groove 48 to which the keys 62, 64 are inserted. The key groove 48 also extends from the first tube end 41 to the second tube end 42. This design allows the keys 62, 64 to position freely within the guide tube 40 and prevents the keys 62, 64 from rotating with respect to the guide tube 40. Alternative designs may include multiple key grooves or different anti-rotation mechanisms such as splines or flats.

The guide tube 40 includes an inner surface 46 defining the tube hole 45 and the key groove 48. Preferably, the inner surface 46 of the tube hole 45 is precisely machined to cause more friction than the friction between the keys 62, 64 and the shaft 30 when the shaft 30 slides through the shaft insertion holes **62*h*, 64*h*. This prevents the keys 62, 64 from moving with respect to the guide tube 40. In some embodiments, the inner surface 46 may be coated with a high-friction material or treated to enhance its wear resistance. Alternative embodiments may include bolt and nut to fix the keys 62, 64 onto the tube hole 45**, adhesive, or a continuous ring-like protrusion for enhanced stability.

The guide tube 40 includes an outer surface 47 that defines the external shape of the main part 43. The outer surface 47 surrounds the inner surface 46. As shown in FIGS. 3 to 6, the outer surface 47 is designed to fit with the tube insertion hole 54 of the spring bearing 52 on the stay 50. The dimensions and finish of the outer surface 47 are carefully controlled to ensure a proper fit and to prevent excessive play or wobble during operation. In alternative embodiments, the outer surface 47 may include additional features such as grooves or texturing to enhance its grip within the stay 50.

The guide tube 40 is typically manufactured from a durable material such as steel or a high-strength polymer. The choice of material depends on factors such as load requirements, environmental conditions, and cost considerations. In some embodiments, the guide tube 40 may be constructed from a composite material or feature a metal core with a polymer coating to combine strength with reduced friction.

As shown in FIGS. 3 to 6, the stay 50 is provided on the mower deck 2 to support the guide tube 40. The stay 50 serves as an anchor point for the mower drive belt tensioner 19, ensuring its proper positioning relative to the mower deck 2. As shown in FIG. 6, the stay 50 includes the spring bearing 52 that protrudes from the guide tube 40 in the radial direction. The spring bearing 52 has the tube insertion hole 54 through which the main part 43 of the guide tube 40 is configured to pass. This arrangement allows for the creation of two distinct spaces: a first space S1 provided around the shaft 30 and the guide tube 40 between the spring bearing 52 and the flange 36, and a second space S2 provided around the shaft 30 and the guide tube 40 between the spring bearing 52 and the shaft support 24. These spaces are designed to selectively accommodate the spring 60 to bias the idler pulley 21. Various designs of the stay 50 can be implemented to suit different mower deck configurations and to optimize the tensioner's performance.

The overall designs of the guide tube 40 and the stay 50 allow for efficient assembly and disassembly of the mower drive belt tensioner 19. Its structure facilitates the selective positioning of the spring 60 in either the first space S1 or the second space S2, enabling the mower drive belt tensioner 19 to function in both pull and push configurations as needed for different mower designs or operating conditions. The ability to easily switch between these configurations provides manufacturers with flexibility in mower design and allows for optimization of belt tension in various mower models.

<Structure of Idler Arm>

Figure 10:
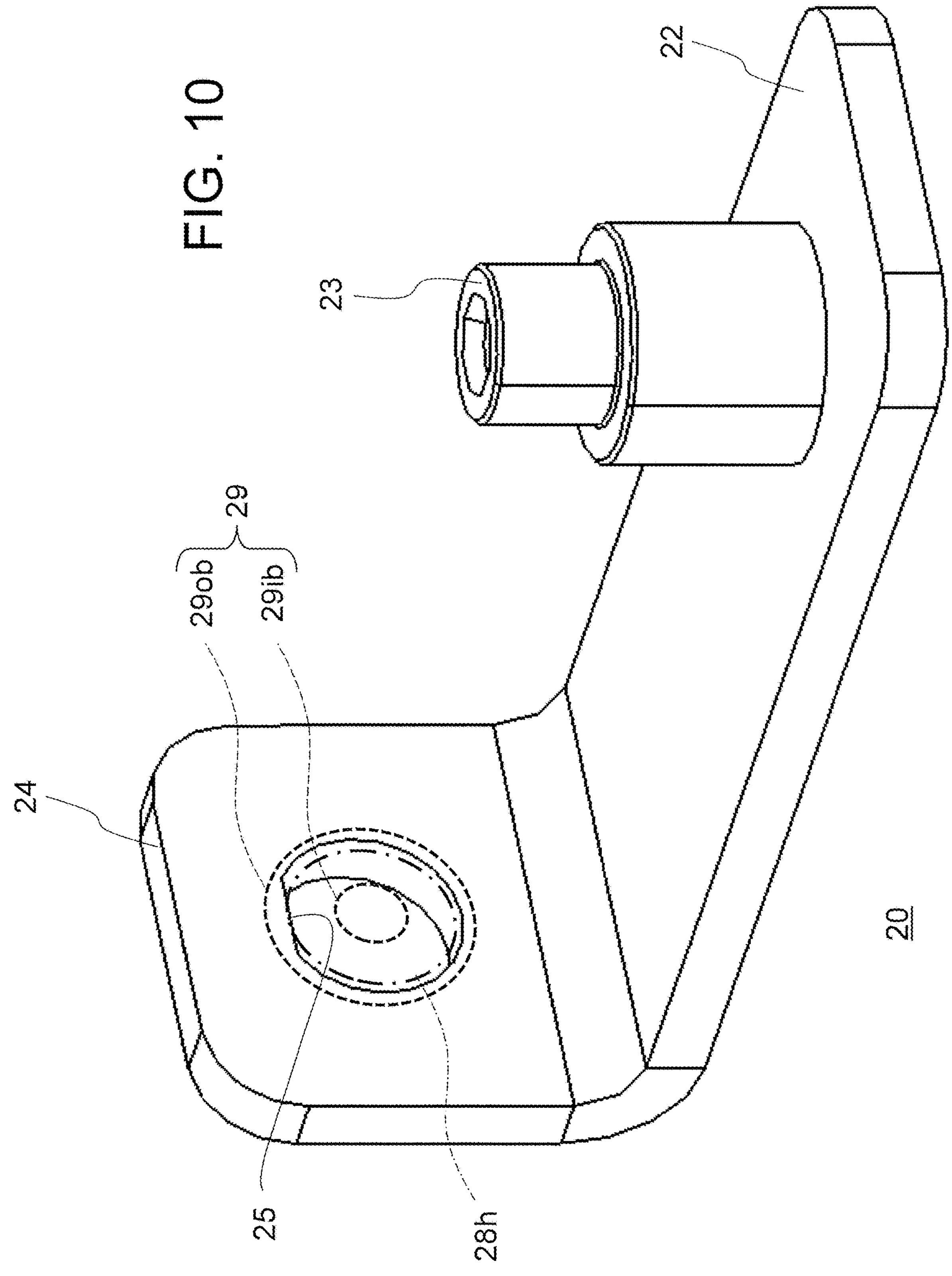
FIG. 10 shows an enlarged perspective view of the idler arm.

FIG. 10 shows an enlarged perspective view of the idler arm 20. As shown in FIG. 10, the idler arm 20 is made of an angle material, with the pulley support 22 forming one leg and the shaft support 24 forming another leg. The pulley support 22 support a pillow block 23 which is a bearing housing that supports a shaft of the idler pulley 21 and allows the idler pulley 21 to rotate freely while maintaining proper alignment with the drive belt 12. The pillow block 23 may be designed with a suitable bearing surface or mounting point to accommodate various types of idler pulleys. In alternative embodiments, the pillow block 23 could be adjustable to accommodate different sizes of idler pulleys or to allow for fine-tuning of the pulley position. The pillow block 23 may feature various surface treatments or coatings to enhance corrosion resistance and durability in outdoor environments. Alternative designs of the pillow block 23 may incorporate different bearing types, such as roller bearings or bushings, depending on the specific load requirements and operating conditions of the mower 1. As shown in FIG. 6, the pulley support 22 includes a mounting point MP for the pillow block 23. The pillow block 23 is typically mounted to a fixed portion of the pulley support 22. Accordingly, the pulley support 22 is configured to rotatably support the idler pulley 21. Alternative designs may include a quick-release mechanism for easy pulley replacement or an adjustable mounting system to fine-tune pulley position.

As shown in FIGS. 4 and 10, the shaft support 24 protrudes from the shaft 30 in the radial direction with respect to the central axis Ax. The shaft support 24 serves as the connection point between the idler arm 20 and the shaft 30, transferring the tensioning force to the idler pulley 21. The shaft support 24 has a through hole 25 fitting with the circumference **31*c* of the shaft 30 with the cutout 35, allowing for precise orientation and secure attachment of the idler arm 20. The through hole 25 may be machined to tight tolerances to ensure a proper fit with the shaft 30 such that the idler arm 20 is slidable on the shaft 30. Alternative designs may incorporate an eccentric or slotted through hole to allow for fine adjustment of the position of the idler arm 20 relative to the shaft 30**.

In FIG. 10, the arm retainer 29 is illustrated as a dotted line. More specifically, the arm retainer 29 is a washer having an inner boundary **29*i* through which a thread of the bolt 28*b* passes when the bolt 28*b* is tightened in the threaded hole 33, and outer boundary 29*o* provided opposite to the inner boundary 29*i*. Furthermore, the circumference of head 28*h* of the bolt 28*b* is illustrated as a dot and dash line. FIG. 10 shows a diameter of the arm retainer 29 is larger than the through hole 25. Accordingly, the arm retainer 29 is configured to hold the shaft support 24 on the shaft 30 securely. The configuration of the through hole 25 and the arm retainer 29 allows for the necessary movement of the idler arm 20 when the drive belt 12 is suddenly loosened. The second fastener 28** may have different structure, using such as snap-fit mechanisms or quick-release systems to facilitate easier assembly or maintenance.

The idler arm 20 can be manufactured from various materials, such as steel or aluminum, depending on the specific requirements of strength and weight for the mower application. In addition, alternative embodiments may include idler arms made of different materials or shapes, such as a unibody construction or a reinforced composite structure, to suit various operational requirements.

<Arrangement of Flange>

As shown in FIGS. 3 to 6, the shaft 30 includes a male thread 34 provided at the second shaft end 32. The first fastener 38 includes a nut 38N tightened to the male thread 34 to abut onto the flange 36. This male thread 34 is designed to engage with the nut 38N to secure the flange 36 onto the shaft 30. The male thread 34 allows for precise adjustment of the flange position along the shaft 30, which in turn affects the tensioning of the drive belt 12. In some embodiments, the male thread 34 may extend for a significant portion of the shaft length to provide a wide range of adjustment.

The flange 36 is provided on the shaft 30, protruding from the shaft 30 in the radial direction with respect to the central axis Ax. The flange 36 serves multiple purposes, including acting as a stop for the spring 60 and providing a surface for attachment of the first fastener 38. As shown in FIG. 5, the flange 36 has an attachment hole 37 through which the shaft 30 is configured to pass. The first fastener 38 (the nut 38N) is provided on the male thread 34 (the second shaft end 32) of the shaft 30 to fasten the flange 36 onto the shaft 30. This arrangement allows for adjusting the distance between the spring bearing 52 and the flange 36 along the central axis Ax, thereby altering the tension applied to the drive belt 12. This feature provides a simple yet effective means of fine-tuning the belt tension to optimize mower performance. The first fastener 38 may have a different structure using different fastening mechanisms at the second shaft end 32, such as a quick-release mechanism or a bayonet mount, depending on the specific requirements of the mower design.

<Arrangement of Spring>

The spring 60 is a key element in the tensioning mechanism. It can be selectively provided in the first space S1 or the second space S2 to bias the idler pulley 21. This selective positioning allows for adjustment of the tensioning force and direction. In FIG. 3, the spring 60 is a compression spring and provided in the first space S1 to pull the idler pulley 21. However, a tension spring can be provided in the second space S2. In such case, the shaft support 24 and the spring bearing 52 need to have hooks or holes on which such a tension spring is hooked. Furthermore, the spring 60 can be a coil spring, but other types such as torsion springs or leaf springs could also be used depending on the specific design requirements and space constraints of the mower drive belt tensioner 19.

<Another Configuration of the Mower Drive Belt Tensioner>

Figure 11:
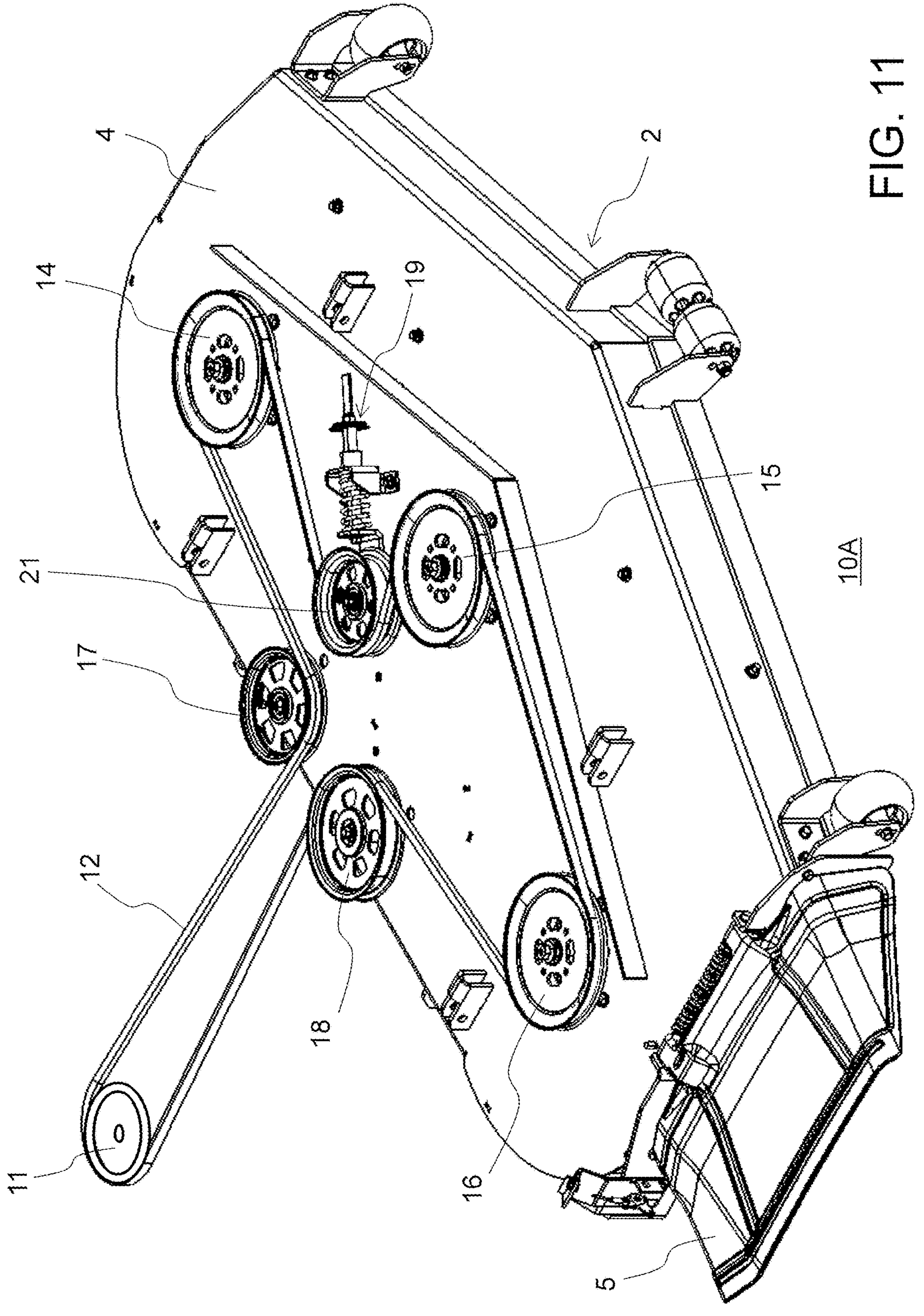
FIG. 11 shows a perspective view of another drive train of the mower.

FIG. 11 shows a perspective view of another drive train 10A of the mower 1. Most of the configuration of the drive train 10A is identical to the configuration of the drive train 10. The drive train 10A is different from the drive train 10 in that the idler pulley 21 is provided between the driven pulleys 14, 15 and the spring 60, which is a compression spring, is provided in the second space S2. Accordingly, explanation of the identical features is omitted.

Figure 12:
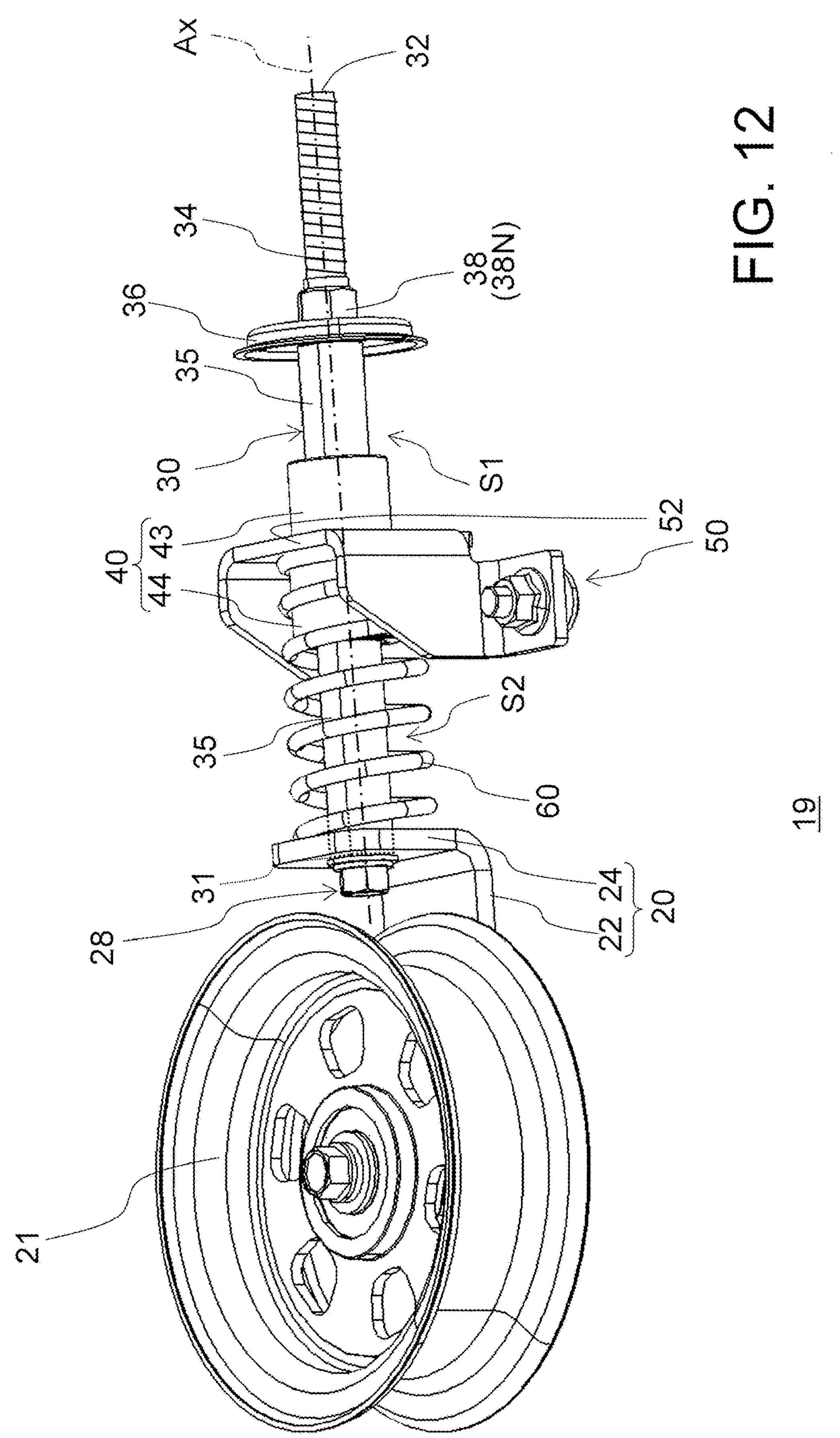
FIG. 12 shows an enlarged perspective view of the mower drive belt tensioner in accordance with the drive train shown in FIG. 11.

FIG. 12 is an enlarged perspective view of a mower drive belt tensioner 19. In contrast with FIG. 3, FIG. 12 shows an embodiment in which the spring 60 is disposed in the second space S2. In this case, the flange 36 is preferably placed on an inner end of the male thread 34 so as not to disengage the additional key 64 on the cutout 35. In FIG. 12, the spring 60 is a compression spring. The spring 60 is configured to push the idler pulley 21. However, the spring 60 may be a tension spring and disposed in the first space S1. In such a case, it is preferable for the spring bearing 52 and the flange 36 to have a hook or a hole on which the spring is hooked. Other features are the same as those shown in FIG. 3, thus further explanation is omitted.

According to the above embodiment, a mower drive belt tensioner 19 can selectively push and pull the idler pulley 21.

<Modification of the Mower Drive Belt Tensioner>

The first space S1 and the second space S2 are not limited to those shown in the above embodiment. For example, the first space S1 may be provided around the shaft 30 between the first tube end 41 of the guide tube 40 and the flange 36. The second space S2 may be provided around the shaft 30 between the second tube end 42 of the guide tube 40 and the shaft support 24 of the idler arm 20. In this case, the first tube end 41 or the second tube end 42 can provide a bearing surface for the spring 60 when it is positioned in either the first space S1 or second space S2, helping to distribute the spring force. In this structure, the mower drive belt tensioner 19 can also selectively push and pull the idler pulley 21.

Furthermore, the mower drive belt tensioner 19 may not have keys 62, 64. In this case, the guide tube 40 preferably has the inner surface 46 whose shape fits with the circumference 31*c* of the shaft 30. The inner surface 46 is preferably smooth and precisely machined to minimize friction and ensure consistent movement of the shaft 30. Alternatively, the inner surface 46 and/or the circumference 31*c* of the shaft 30 may be coated with a low-friction material or treated to enhance its wear resistance. Furthermore, the mower drive belt tensioner 19 may have two springs, one of which is provided in the first space S1 and the other of which is provided in the second space S2. One of the two springs is preferably a compression spring and the other of the two springs is preferably a tension spring.

The present application refers to words "include" and derivatives as nonrestrictive terms for description of provision of constituent elements, without exclusion of any other constituent element not referred to in the present application. The same applies to words "have", "provided with", and derivatives thereof.

Expressions "member", "part", "element", "body", and "structure" may have a plurality of meanings indicating a single portion and a plurality of portions.

Ordinal numbers "first", "second", and the like are terms for simple distinction among configurations, without having any other meaning (e.g. specific order). For example, provision of a "first element" does not indicate provision of a "second element", and provision of the "second element" does not indicate provision of the "first element".

Expressions "substantially", "approximately", "about", and the like indicating degrees may each have a rational deviation not significantly changing a final result. All the numerical values referred to in the present application may be interpreted as including any one of the expressions "substantially", "approximately", "about", and the like.

In the present application, an expression "at least one of A and B" is interpreted to encompass (1) only A, (2) only B, and (3) both A and B.

In view of the above disclosure, the present invention can obviously include various modifications and alterations. The present invention may thus be implemented in any manner different from those specifically disclosed in the present application without departing from the spirit of the preset invention.

What is claimed is:

1. A mower drive belt tensioner comprising:

an idler pulley configured to be engaged by a drive belt;

an idler arm comprising:

a pulley support configured to rotatably support the idler pulley; and a shaft support opposite to the pulley support;

a shaft having a central axis along which the shaft extends and a circumference provided around the central axis, the shaft being connected to the shaft support of the idler arm, the shaft support protruding from the shaft in a radial direction with respect to the central axis;

a flange provided on the shaft apart from the shaft support and protruding from the shaft in the radial direction;

a guide tube provided between the shaft support and the flange along the central axis and configured to slidably receive the shaft;

a stay provided on a mower deck to support the guide tube and comprising a spring bearing protruding from the guide tube in the radial direction; and a spring selectively provided in a first space and a second space to bias the idler pulley, the first space being provided around the shaft and the guide tube between the spring bearing and the flange, the second space being provided around the shaft and the guide tube between the spring bearing and the shaft support, wherein the shaft support has a through hole fitting with the circumference such that the shaft support is slidable on the shaft.

2. The mower drive belt tensioner according to claim 1, wherein the shaft has a first shaft end at which the shaft support is provided, and a second shaft end opposite to the first shaft end along the central axis, wherein the flange has an attachment hole through which the shaft is configured to pass, and wherein the mower drive belt tensioner further comprises a first fastener provided on the second shaft end to fasten the flange onto the shaft to adjust a distance between the spring bearing and the flange along the central axis.

3. The mower drive belt tensioner according to claim 2, wherein the shaft comprises a male thread provided at the second shaft end, and wherein the first fastener includes a nut tightened to the male thread to abut onto the flange.

4. The mower drive belt tensioner according to claim 3, wherein the mower drive belt tensioner further comprises a second fastener provided at the first shaft end to hold the shaft support on the shaft.

5. The mower drive belt tensioner according to claim 1, wherein the shaft has a first shaft end at which the shaft support is provided, and a second shaft end opposite to the first shaft end along the central axis, wherein the shaft comprises a male thread provided at the second shaft end, wherein the shaft comprises a threaded hole provided at the first shaft end, wherein the circumference extends from the first shaft end to the male thread, and wherein the second fastener includes a bolt tightened into the threaded hole, and an arm retainer provided between a head of the bolt and the shaft support and configured to hold the shaft support on the shaft.

6. The mower drive belt tensioner according to claim 5, wherein the idler arm is made of an angle material, wherein the pulley support is one leg of the angle material, and wherein the shaft support is another leg of the angle material other than the one leg.

7. The mower drive belt tensioner according to claim 1, wherein the spring bearing has a tube insertion hole through which the guide tube is configured to pass, wherein the guide tube includes a first tube end facing the flange, a second tube end facing the shaft support, a tube hole which extends from the first tube end to the second tube end and through which the shaft passes, an inner surface defining the tube hole, an outer surface surrounding the inner surface and defining a main part of the guide tube that is configured to pass through the tube insertion hole, and a boss protruding from the main part in the radial direction to abut onto the spring bearing when the main part passes through the tube insertion hole.

8. The mower drive belt tensioner according to claim 1, further comprising:

a key provided between the guide tube and the shaft to prevent rotation of the shaft with respect to the guide tube, wherein the guide tube includes a key groove to which the key is inserted, and wherein the shaft includes a cutout to which the key is inserted.

9. A drive train of a mower, comprising:

the mower drive belt tensioner according to claim 1;

the mower deck supporting the stay;

a drive pulley rotatably provided on the mower deck and configured to be driven by a prime mover;

a driven pulley rotatably provided on the mower deck and configured to rotate a cutting blade; and the drive belt looping around the idler pulley, the drive pulley, and the driven pulley, the spring being configured to tighten the drive belt to engage with the idler pulley, the drive pulley, and the driven pulley.

10. A mower drive belt tensioner comprising:

an idler pulley configured to be engaged by a drive belt;

an idler arm comprising:

a pulley support configured to rotatably support the idler pulley; and a shaft support opposite to the pulley support;

a shaft having a central axis along which the shaft extends and a circumference provided around the central axis, the shaft being connected to the shaft support of the idler arm, the shaft support protruding from the shaft in a radial direction with respect to the central axis;

a flange provided on the shaft apart from the shaft support and protruding from the shaft in the radial direction;

a guide tube provided between the shaft support and the flange along the central axis and configured to slidably receive the shaft, the guide tube comprising:

a first tube end facing the flange;

a second tube end facing the shaft support; and a tube hole which extends from the first tube end to the second tube end and through which the shaft passes;

a stay provided on a mower deck to support the guide tube; and a spring selectively provided in a first space and a second space to bias the idler pulley, the first space being provided around the shaft between the first tube end and the flange, the second space being provided around the shaft between the second tube end and the shaft support, wherein the shaft support has a through hole fitting with the circumference such that the shaft support is slidable on the shaft.

11. The mower drive belt tensioner according to claim 10, wherein the shaft has a first shaft end at which the shaft support is provided, and a second shaft end opposite to the first shaft end along the central axis, wherein the flange has an attachment hole through which the shaft is configured to pass, and wherein the mower drive belt tensioner further comprises a first fastener provided on the second shaft end to fasten the flange onto the shaft to adjust a distance between the first shaft end and the flange along the central axis.

12. The mower drive belt tensioner according to claim 11, wherein the shaft comprises a male thread provided at the second shaft end, and wherein the first fastener includes a nut tightened to the male thread to abut onto the flange.

13. The mower drive belt tensioner according to claim 12, wherein the mower drive belt tensioner further comprises a second fastener provided at the first shaft end to hold the shaft support on the shaft.

14. The mower drive belt tensioner according to claim 10, wherein the shaft has a first shaft end at which the shaft support is provided, and a second shaft end opposite to the first shaft end along the central axis, wherein the shaft comprises a male thread provided at the second shaft end, wherein the shaft comprises a threaded hole provided at the first shaft end, wherein the circumference extends from the first shaft end to the male thread, and wherein the second fastener includes a bolt tightened into the threaded hole, and an arm retainer provided between a head of the bolt and the shaft support and configured to hold the shaft support on the shaft.

15. The mower drive belt tensioner according to claim 14, wherein the idler arm is made of an angle material, wherein the pulley support is one leg of the angle material, and wherein the shaft support is another leg of the angle material other than the one leg.

16. The mower drive belt tensioner according to claim 10, wherein the stay has a tube insertion hole through which the guide tube is configured to pass, wherein the guide tube includes an inner surface defining the tube hole, an outer surface surrounding the inner surface and defining a main part of the guide tube that is configured to pass through the tube insertion hole, and a boss protruding from the main part in the radial direction to abut onto the stay when the main part passes through the tube insertion hole.

17. The mower drive belt tensioner according to claim 10, further comprising:

a key provided between the guide tube and the shaft to prevent rotation of the shaft with respect to the guide tube, wherein the guide tube includes a key groove to which the key is inserted, and wherein the shaft includes a cutout to which the key is inserted.

18. A drive train of a mower, comprising:

the mower drive belt tensioner according to claim 10;

the mower deck supporting the stay;

a drive pulley rotatably provided on the mower deck and configured to be driven by a prime mover;

a driven pulley rotatably provided on the mower deck and configured to rotate a cutting blade; and the drive belt looping around the idler pulley, the drive pulley, and the driven pulley, the spring being configured to tighten the drive belt to engage with the idler pulley, the drive pulley, and the driven pulley.

19. A mower drive belt tensioner comprising:

an idler pulley configured to be engaged by a drive belt;

an idler arm comprising:

a pulley support configured to rotatably support the idler pulley; and a shaft support opposite to the pulley support;

a shaft having a central axis along which the shaft extends, the shaft being connected to the shaft support of the idler arm, the shaft support protruding from the shaft in a radial direction with respect to the central axis;

a flange provided on the shaft apart from the shaft support and protruding from the shaft in the radial direction;

a guide tube provided between the shaft support and the flange along the central axis and configured to slidably receive the shaft;

a stay provided on a mower deck to support the guide tube and comprising a spring bearing protruding from the guide tube in the radial direction; and a spring selectively mountable in either a first space or a second space, the first space being provided around the shaft and the guide tube between the spring bearing and the flange, the second space being provided around the shaft and the guide tube between the spring bearing and the shaft support, the spring being configured to pull the shaft support when the spring is mounted in the first space, the spring being configured to push the shaft support when the spring is mounted in the second space.

20. A mower drive belt tensioner comprising:

an idler pulley configured to be engaged by a drive belt;

an idler arm comprising:

a pulley support configured to rotatably support the idler pulley; and a shaft support opposite to the pulley support;

a shaft having a central axis along which the shaft extends, the shaft being connected to the shaft support of the idler arm, the shaft support protruding from the shaft in a radial direction with respect to the central axis;

a flange provided on the shaft apart from the shaft support and protruding from the shaft in the radial direction;

a guide tube provided between the shaft support and the flange along the central axis and configured to slidably receive the shaft, the guide tube comprising:

a first tube end facing the flange;

a second tube end facing the shaft support; and a tube hole which extends from the first tube end to the second tube end and through which the shaft passes;

a stay provided on a mower deck to support the guide tube; and a spring selectively mountable in either a first space or a second space, the first space being provided around the shaft between the first tube end and the flange, the second space being provided around the shaft between the second tube end and the shaft support, the spring being configured to pull the shaft support when the spring is mounted in the first space, the spring being configured to push the shaft support when the spring is mounted in the second space.

* * * * *